United States Patent [19]

Jeanes et al.

[11] Patent Number: 5,209,848
[45] Date of Patent: May 11, 1993

[54] XYLYLENE BASED POLYETHER MEMBRANES FOR GAS SEPARATION

[75] Inventors: Thomas O. Jeanes, Antioch; Ritchie A. Wessling, Berkeley, both of Calif.

[73] Assignee: The Dow Chemical Company, Midland, Mich.

[21] Appl. No.: 748,479

[22] Filed: Aug. 22, 1991

[51] Int. Cl.$^5$ .................. B01D 69/08; B01D 69/12
[52] U.S. Cl. ................................ 210/490; 55/16; 210/500.23; 210/500.28
[58] Field of Search ............ 210/490, 500.28, 500.27, 210/500.23; 55/16, 68, 158

[56] References Cited

U.S. PATENT DOCUMENTS

| | | | |
|---|---|---|---|
| 3,855,122 | 12/1974 | Bourganel | 210/490 X |
| 4,026,977 | 5/1977 | Bourganel | 264/41 |
| 4,837,293 | 6/1989 | Silvis et al. | 528/99 |
| 4,882,057 | 11/1989 | Morgan et al. | 210/500.23 |

FOREIGN PATENT DOCUMENTS

| | | |
|---|---|---|
| 362603 | 4/1990 | European Pat. Off. . |
| 364741 | 4/1990 | European Pat. Off. . |
| 3838644 | 5/1990 | Fed. Rep. of Germany . |
| 51-115285 | 10/1976 | Japan . |
| 57-21419 | 2/1982 | Japan . |
| 8008506 | 1/1983 | Japan . |
| 61-000429 | 1/1986 | Japan . |
| 1081823 | 3/1989 | Japan . |

*Primary Examiner*—Frank Spear
*Attorney, Agent, or Firm*—Janet Pauline Clark

[57] ABSTRACT

The invention relates to novel xylylene based polyether gas separation membranes and a method of separating gases using such membranes.

22 Claims, No Drawings

XYLYLENE BASED POLYETHER MEMBRANES FOR GAS SEPARATION

BACKGROUND OF THE INVENTION

This invention relates to novel semi-permeable xylylene based polyether gas separation membranes and a process of separating gases using said membranes.

The use of membranes to separate gases is known in the art. Membranes have been used to recover or isolate a variety of gases, including hydrogen, helium, oxygen, nitrogen, carbon monoxide, carbon dioxide, water vapor, hydrogen sulfide, ammonia, and/or light hydrocarbons. Applications of particular interest include the separation of hydrogen or helium from gas mixtures such as mixtures containing nitrogen, carbon monoxide, carbon dioxide, water vapor, and/or light hydrocarbons. For example, the separation and recovery of hydrogen for recycle is often necessary in various hydrocracker, hydrotreater, and catalytic cracking processes used in the oil refinery industry. Other applications of interest include the separation of carbon dioxide from light hydrocarbons or other crude oil components as part of the tertiary oil recovery process. Additional applications include the recovery of an enriched oxygen stream from air for use in enhanced combustion or fermentation processes. Alternatively, an enriched nitrogen stream may be obtained from air for use as an inert atmosphere over flammable fluids or for food storage. Membranes can be used to achieve such separations.

Such membrane separations are based on the relative permeability of two or more gaseous components through the membrane. To separate a gas mixture into two portions, one richer and one leaner in at least one gaseous component, the mixture is brought into contact with one side of a semi-permeable membrane through which at least one of the gaseous components selectively permeates. A gaseous component which selectively permeates through the membrane passes through the membrane more rapidly than at least one other gaseous component of the mixture. The gas mixture is thereby separated into a stream which is enriched in the selectively permeating gaseous component or components and a stream which is depleted in the selectively permeating gaseous component or components. A relatively non-permeating gaseous component passes more slowly through the membrane than at least one other gaseous component of the mixture. An appropriate membrane material is chosen so that some degree of separation of the gas mixture can be achieved.

Membranes for gas separation have been fabricated from a wide variety of polymers, including certain cellulose esters and ethers, aromatic polyimides, polyaramides, polysulfones, polyethersulfones, polyesters, and polycarbonates. An ideal gas separation membrane is characterized by the ability to operate under high temperatures and/or pressures while possessing a high gas separation factor (selectivity) and high gas permeability. Solvent resistance is also preferred; however, gas separation membranes also are preferably fabricated from polymers which are easily processed. The problem is finding membrane materials which possess all the desired characteristics. Polymers possessing high separation factors generally have low gas permeabilities, while those polymers possessing high gas permeabilities generally have low separation factors. In the past, a choice between a high gas separation factor and a high gas permeability has been unavoidably necessary. Furthermore, some of the polymers previously used for membranes suffer from the disadvantage of poor performance under high operating temperatures and pressures. However, those polymers capable of operating at high temperatures and pressures are typically difficult to fabricate into membranes. Solvent resistance is also generally obtainable only with polymers which are difficult to fabricate into membranes. A membrane capable of separating gas mixtures which possesses good selectivity, adequate gas permeability, ability to operate under extreme conditions of temperature and pressure, improved solvent resistance, and ease of fabrication is needed.

SUMMARY OF THE INVENTION

The invention is a semi-permeable gas separation membrane comprising a thin discriminating region of a xylylene based polyether polymer possessing a backbone structure corresponding to Formula I:

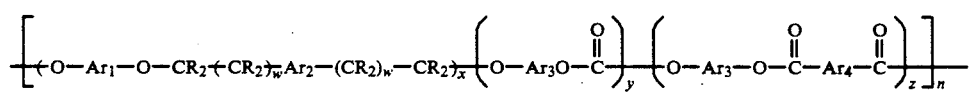

FORMULA I wherein

R is individually in each occurrence a hydrogen radical, a monovalent $C_{1-12}$ hydrocarbyl radical, a $C_{1-12}$ halohydrocarbyl radical, and a halogen, $Ar_1$, $Ar_2$, $Ar_3$, and $Ar_4$ are individually in each occurrence a divalent aromatic residue selected from the group consisting of:

A. an unsubstituted or inertly substituted phenylene, or an unsubstituted or inertly substituted naphthylene;

B. a bisphenylene of the formula:

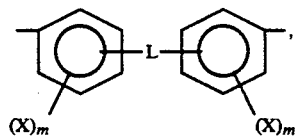

wherein

L is individually in each occurrence selected from the group consisting of a direct bond, a divalent $C_{1-15}$ hydrocarbyl radical, a divalent $C_{1-8}$ halohydrocarbyl radical, —O—, —CO—, —S—, —SO$_2$—, and —SS—, X is individually in each occurrence selected from the group consisting of a hydrogen radical, a monovalent $C_{1-4}$ hydrocarbyl radical, a $C_{1-4}$ halohydrocarbyl radical, and a halogen, and m is individually in each occurrence a positive integer between 1 and 4 inclusive; and C. a divalent bisphenyl fluorenyl or spiro indanyl radical;

w is a positive integer between 0 and 3 inclusive;

x is a positive integer between 1 and about 500 inclusive, y is a positive integer between 0 and about 500 inclusive, and z is a positive integer between 0 and about 500 inclusive, wherein the ratio of $$\frac{x}{(x+y+z)}$$

is between about 0.002 and 1 inclusive; and n is a positive integer representing a degree of polymerization which provides a number-average molecular weight of at least about 3,000.

In another aspect, the invention is a process of separating gases comprising:

A. contacting one side of a semi-permeable gas separation membrane with a feed gas mixture under pressure, wherein the membrane divides a separation chamber into a high pressure side into which the feed gas mixture is fed and a low pressure side;

B. maintaining a pressure differential across the membrane under conditions such that at least one gaseous component in the feed gas mixture selectively permeates through the membrane from the high pressure side to the low pressure side of the membrane;

C. removing from the low pressure side of the membrane permeated gas which is enriched in at least one selectively permeating gaseous component; and D. removing from the high pressure side of the membrane non-permeated gas which is depleted in at least one selectively permeating gaseous component;

wherein the membrane comprises a thin discriminating region of a xylylene based polyether polymer possessing a backbone structure corresponding to Formula I.

The membranes of this invention possess good gas selectivity and adequate gas permeability, adequate mechanical strength, good temperature and solvent resistance, and are readily fabricated.

DETAILED DESCRIPTION OF THE INVENTION

The gas separation membranes of this invention are fabricated from xylylene based polyether polymers and include arylether-alkylarylalkylether-arylcarbonate-arylester copolymers. The arylether-alkylarylalkylether copolymers may optionally contain arylester, arylester-carbonate, and/or arylcarbonate segments.

R is individually in each occurrence selected from the group consisting of a hydrogen radical, a monovalent $C_{1-12}$ hydrocarbon radical, a monovalent $C_{1-12}$ halohydrocarbon radical, and a halogen. In preferred embodiments, R is individually in each occurrence selected from the group consisting of a hydrogen radical, a monovalent $C_{1-6}$ hydrocarbon radical, a monovalent $C_{1-6}$ halohydrocarbon radical, and a halogen.

In the embodiments wherein $Ar_1$ and/or $Ar_2$ and/or $Ar_3$ and/or $Ar_4$ comprise an inertly substituted phenylene or naphthylene, the phenolic rings may be substituted with inert substituents, that is, substituents which do not substantially interfere with the use of the polymer in the intended application. In many applications, this means that the inertly substituted sites on the phenolic rings are substantially chemically unreactive. Preferred inert substituents include monovalent $C_{1-8}$ hydrocarbyl radicals, monovalent $C_{1-8}$ hydrocarbyloxy radicals, and halogens. More preferred inert substituents include monovalent $C_{1-6}$ hydrocarbyl radicals, monovalent $C_{1-6}$ hydrocarbyloxy radicals, and halogens. Preferred halogens include fluorine, chlorine, bromine, and iodine; more preferred halogens include fluorine, chlorine, and bromine; even more preferred halogens include chlorine and bromine; the most preferred halogen is bromine.

In the embodiment wherein $Ar_1$ and/or $Ar_2$ and/or $Ar_3$ and/or $Ar_4$ comprise a bisphenylene of the formula:

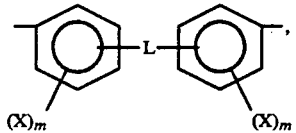

L is preferably a direct bond, a divalent $C_{1-8}$ hydrocarbyl radical, a divalent $C_{1-4}$ halohydrocarbyl radical, —O—, —CO—, —S—, —SO—, —SO$_2$—, or —SS—. For L, preferred halohydrocarbyl radicals include bromo-, chloro-, and fluoro- hydrocarbyl radicals. L is more preferably a direct bond, a divalent $C_{1-6}$ hydrocarbyl radical, a divalent $C_{1-6}$ halohydrocarbyl radical, —O—, —CO—, —S—, —SO—, —SO$_2$—, or —SS—; L is even more preferably a direct bond, a divalent $C_{1-3}$ hydrocarbyl radical, or a divalent $C_{1-3}$ fluorohydrocarbyl radical; L is most preferably a direct bond or an unsubstituted or fluoro-substituted methylene or isopropylidene radical.

X is preferably a hydrogen radical, a monovalent $C_{1-6}$ hydrocarbyl radical, a monovalent $C_{1-6}$ halohydrocarbyl radical, or a halogen. For X, preferred halohydrocarbyl radicals include fluoro-, bromo-, and chlorohydrocarbyl radicals and preferred halogens include bromine, chlorine, and fluorine.

w is preferably a positive integer between 0 and 3 inclusive, more preferably between 0 and 2 inclusive, even more preferably 0.

x is preferably a positive integer between 1 and about 500 inclusive, more preferably a positive integer between 1 and about 250 inclusive, even more preferably a positive integer between 1 and about 100 inclusive.

y and z are each individually preferably a positive integer between 0 and about 500 inclusive, more preferably a positive integer between 0 and about 250 inclusive, even more preferably a positive integer between 0 and about 100.

The ratio of $$\frac{x}{(x+y+z)}$$

is preferably between about 0.002 and 1.0 inclusive, more preferably between about 0.25 and 1.0 inclusive, even more preferably between about 0.50 and 1.0 inclusive.

The polymers useful in this invention may be prepared by the reaction of a bisphenyl with a dichloroxylene in the presence of a base, such as potassium carbonate, an azeotroping agent, such as toluene, and a suitable solvent, such as N-methyl-2-pyrrolidinone. Optionally, a solution containing a mixture of the bisphenolic capped ether oligomer and a second bisphenolic compound may be treated with an acid chloride and/or phosgene in the presence of a base to provide a random copolymer. The bisphenolic capped ether oligomers preferably possess a number-average molecular weight of between 320 and about 6,000. The reaction is preferably carried out under an inert atmosphere such as nitrogen or argon. The polymerization reaction is carried out at an appropriate temperature for a period of time sufficient to enable the polymer to achieve a useful degree of polymerization. The reaction temperatures are typically greater than about 100° C. for the polymerization of the arylether-alkylarylalkylether polymers and the bisphenolic capped ether oligomers and between about 5° C. and 35° C. for the further polymerization involving the acid chloride and/or phosgene. Upon completion of polymerization, the reaction mixture is acidified with a dilute solution of an acid such as hydrochloric acid and precipitated in an alcohol such as methanol. The precipitated polymer is preferably recovered by filtration, optionally washed or redissolved and reprecipitated to further purify the polymer, and dried.

The polymers possess a number-average molecular weight ($M_n$) such that the polymers are useful for forming fibers, films, molded articles, foams, coatings, and the like. The number-average molecular weight of such polymers as measured by gel permeation chromatography is preferably at least about 3,000, more preferably at least about 10,000; the number-average molecular weight of such polymers is preferably less than about 100,000, more preferably less than about 50,000. The intrinsic viscosity of such polymers is preferably between about 0.1 deciliters/gram and about 1.2 deciliters/gram, more preferably between about 0.2 deciliters/gram and about 0.9 deciliters/gram, as measured in a dipolar aprotic solvent such as N-methyl-2-pyrrolidinone or dimethylacetamide. The polymers of this invention are preferably soluble in common dipolar aprotic solvents such as N-methyl-2-pyrrolidinone, dimethylacetamide, dimethylformamide, dimethylsulfoxide, and sulfolane, and chlorinated hydrocarbons.

The polymers useful in this invention preferably possess glass transition temperatures of at least about 50° C., more preferably of at least about 65° C., even more preferably of at least about 80° C. The polymers preferably possess a tensile strength as measured by ASTM D-1708 of at least about 4,000 psi ($2.76 \times 10^4$ kPa), more preferably of at least about 5,000 psi ($3.45 \times 10^4$ kPa). The polymers preferably possess a tensile modulus as measured by ASTM D-1708 of at least about 100 kpsi ($6.90 \times 10^5$ kPa), more preferably of at least about 150 kpsi ($1.03 \times 10^6$ kPa). The polymers preferably possess an elongation at break as measured by ASTM d-1708 of at least about 2 percent, more preferably of at least about 4 percent.

Such polymers are used to fabricate the semi-permeable membranes of this invention. The membranes of this invention may be formed into any useful configuration known to one skilled in the art. In particular, the membranes may be shaped in the form of flat sheets or films, hollow fibers of various cross-sectional shapes, or hollow tubes. Films and hollow fibers of substantially circular cross-section are preferred membrane configurations.

In addition, the membranes of this invention may possess any morphological structure known to one skilled in the art. In particular, the membrane may be a homogeneous membrane, a composite membrane, or an asymmetric membrane. Asymmetric and composite membranes are preferred; asymmetric membranes are more preferred. In the embodiment wherein the membranes possess a hollow fiber configuration, asymmetric membranes may have the discriminating region either on the outside of the hollow fiber, at the inside lumen surface of the hollow fiber, or located somewhere internal to both outside and inside hollow fiber membrane surfaces. In the embodiment wherein the discriminating region of the hollow fiber membrane is internal to both hollow fiber membrane surfaces, the inside surface and the outside surface of the hollow fiber membrane are porous, yet the membrane demonstrates gas discriminating ability, that is, the ability to separate gases.

Homogeneous membranes are prepared by forming a continuous thin discriminating layer which is dense and free of voids and pores. Such membranes possess a discriminating region which generally has substantially the same structure and composition throughout the membrane. In one preferred embodiment, the polymers useful in this invention are dissolved in a solvent, thus forming a polymer/solvent solution which is cast onto a uniform surface from which the membrane may thereafter be readily separated. Preferred casting solvents for the polymers of this invention include chlorinated solvents such as methylene chloride and chloroform and dipolar aprotic solvents such as N-methyl-2-pyrrolidinone, N,N-dimethylacetamide, and dimethylformamide. The polymer/solvent solution should be substantially homogeneous and possess sufficient viscosity to allow casting of the solution onto a uniform surface. Preferably, the solution of polymer/solvent contains polymer in weight percents of between about 5 and about 50, more preferably of between about 10 and about 40, even more preferably of between about 10 and about 30.

The solution is cast onto a uniform surface possessing a low surface energy such as silicone or coated glass, or a surface to which the membrane will not adhere such as mercury, or a liquid with which the polymer is substantially immiscible such as water. Alternatively, the membrane may be cast onto a surface which may be dissolved away from the membrane following devolatizing and drying. Casting is performed by pouring the solution onto the appropriate surface and using an appropriate tool to form a film of the appropriate thickness. A continuous casting process may be achieved by casting the solution onto endless belts or rotating drums. Thereafter, the cast solution is exposed to curing or drying conditions. Such conditions are used to substantially remove the solvent, thereby leaving a thin discriminating layer of polymer which is homogeneous. The solution may be devolatized or dried by either exposure to a vacuum, exposure to elevated temperatures, allowing the solvent to evaporate over time, or any combination thereof. Generally, it is preferable to expose the cast solution to elevated temperatures which are below the glass transition temperature (Tg) of the polymer and preferably more than about Tg-100° C.

Composite membranes are prepared by forming a continuous thin discriminating layer of the polymer on a porous supporting layer. Such membranes possess a discriminating layer which generally has a different structure and composition than the porous supporting layer. To prepare a composite membrane, a homogeneous discriminating layer can be formed and thereafter adhered to a porous supporting layer. Alternatively, the porous supporting layer can be the surface upon which the discriminating layer is cast. In such an embodiment, the composite membrane is prepared by casting a solution as a coating on the porous support. Penetration of the polymer from which the discriminating layer is formed into the pores of the porous supporting layer is acceptable so long as the desired thickness of the membrane is not exceeded. The porous supporting layer is characterized in that it preferably does not significantly impede the transport of gas through the membrane. In one embodiment, the porous supporting layer can be a metal or polymeric plate with a plurality of holes drilled through it. However, such a drilled plate is not advantageous because it may significantly reduce the effective area of the membrane. In a preferred embodiment, the porous supporting layer is a porous polymeric membrane. Examples of such porous polymeric membranes suitable as porous supporting layers in composite membranes include porous cellulose ester and polysulfone porous membranes commercially available under the MILLIPORE, PELLICONE, and DIAFLOW. Other preferred porous supporting layers include porous membranes fabricated from polycarbonates, polyestercarbonates, polyimides, and polyethersulfones. Where such porous supporting membranes are thin or highly deformable, a frame or screen may also be used to adequately support the membrane. In one especially preferred embodiment, the porous polymeric supporting layer is a hollow fiber of a porous polymeric membrane such as a microporous polysulfone membrane. The hollow fiber itself provides adequate support for the discriminating layer coated on the inside or the outside surface of the hollow fiber. After the solution is cast onto the porous supporting layer to form the thin discriminating layer, the membrane is then exposed to curing or drying conditions to substantially remove solvent from the discriminating layer such as described hereinbefore for the formation of homogeneous membranes.

Asymmetric membranes may be prepared by forming a membrane with at least one thin discriminating region and at least one porous supporting region. Such membranes possess a discriminating region which generally has the same composition but a different morphology than the porous supporting region. To prepare an asymmetric membrane, a solution of polymer, solvent, and optional non-solvent is formed and cast as hereinbefore described for homogeneous membranes. Preferred non-solvents for use in this invention include alcohols such as methanol, hydrocarbons such as heptane, and $C_{2-6}$ glycols. The cast solution is partially devolatilized to remove a portion of the solvent and optional non-solvent. Thereafter, one or both surfaces of the partially devolatilized membrane is contacted with a non-solvent for the polymer such as water so as to form a thin discriminating region while substantially removing the solvent and optional non-solvent from the membrane. The porous supporting region formed provides support for the thin discriminating region without significantly impeding the transport of gas through the membrane. The drying step is performed in a manner similar to that described hereinbefore with respect to the formation of homogeneous membranes.

Flat sheet, tubular, and hollow fiber membranes which are homogeneous, composite, or asymmetric may be formed by extrusion from an appropriate solution of the polymer in a solvent and optional non-solvent. Such extrusion processes are well known to those skilled in the art and the formation of such membranes requires the adaptation of the hereinbefore described techniques.

Extrusion is the preferred process for the fabrication of flat sheet, tubular, or hollow fiber membranes. In the case of extrusion, the components of the extrusion mixture may be combined prior to extrusion by mixing in any convenient manner with conventional mixing equipment, as for example, in a Hobart mixer. Alternatively, the extrusion mixture may be homogenized by extruding the mixture through a twin screw extruder, cooling the extrudate, and grinding or pelletizing the extrudate to a particle size readily fed to a single or twin screw exttruder. The components of the extrusion mixture may also be combined directly in a melt-pot or twin screw extruder and extruded into membranes in a single step.

The polymer, solvent, and optional non-solvent mixture is heated to a temperature at which the mixture becomes a substantially homogeneous fluid. The substantially homogeneous fluid is then extruded through a sheet, hollow tube, or hollow fiber die (spinnerette). Hollow fiber spinnerettes are typically multi-holed and thus produce a tow of multiple hollow fibers. The hollow fiber spinnerettes include a means for supplying fluid to the core of the extrudate. The core fluid is used to prevent collapse of the hollow fibers as the exit the spinnerette. The core fluid may be a gas such as nitrogen, air, carbon dioxide, or other inert gas, or a liquid which is a non-solvent for the polymer such as water. Following extrusion, the membrane is treated as hereinbefore described for homogeneous, composite, or asymmetric membranes.

In one preferred embodiment, the membranes are annealed before use. The membrane is preferably exposed to temperatures above about 50° C. and below about 300° C. for a period of time to partially densify the polymer. This procedure may optionally be performed under vacuum.

Preferably, the homogeneous membranes useful in this invention have a thickness of between about 5 microns and about 500 microns, more preferably between about 10 microns and about 150 microns. Hollow fiber homogeneous membranes preferably have an outer diameter of between about 50 microns and about 800 microns, more preferably between about 100 microns and about 300 microns. Preferably, the effective discriminating layer in composite or asymmetric membranes has a thickness of between about 0.02 microns and about 10 microns, more preferably between about 0.02 microns and about 2 microns. Preferably, the supporting layer in composite or asymmetric membranes possesses a thickness of between about 5 microns and about 500 microns, more preferably between about 10 microns and about 150 microns. Hollow fiber composite or asymmetric membranes preferably have an outer diameter in the range of from about 50 microns to about 800 microns, more preferably in the range of from about 100 microns to about 300 microns.

The membranes are fabricated into flat sheet, spiral wound, tubular, or hollow fiber devices by methods known in the art: See U.S. Pat. Nos. 3,228,876; 3,422,008; 3,455,460; 3,475,331; 3,526,001; 3,528,553; 3,690,465; 3,702,658; 3,755,034; 3,801,401; 4,271,900; 3,872,014; 3,966,616; 4,045,851; 4,061,574; 4,080,296; 4,083,780; 4,220,535; 4,235,723; 4,265,763; 4,315,819; 4,430,219; 4,351,092; 4,367,139; 4,666,469; 4,707,167; 4,752,305; 4,758,341; 4,871,379; and 4,929,259; the relevant portions of each patent relating to device fabrication incorporated herein by reference for all legal purposes which may be served thereby.

The membranes are sealingly mounted in a pressure vessel in such a manner that the membrane separates the vessel into two fluid regions wherein fluid flow between the two regions is accomplished by fluid permeating through the membrane. Under certain conditions, it may be highly desirable to provide support for the membrane when the membrane is employed in a separation apparatus or process. In one embodiment, the peripheral area of the membrane is affixed to a framing structure which supports the outer edge of the membrane. The membrane can be affixed to the framing structure by a clamping mechanism, adhesive, chemical bonding, or other techniques known in the art. The membrane affixed to the frame can then be sealingly engaged in the conventional manner in a vessel so that the membrane surface inside the framing support separates two otherwise non-communicating regions in the vessel. One skilled in the art will recognize that the structure which supports the membrane can be an internal part of the vessel or even the outer edge of the membrane.

The membrane divides the separation chamber into two regions, a high pressure side into which the feed gas mixture is introduced and a lower pressure side. One side of the membrane is contacted with a feed gas mixture under pressure, while a pressure differential is maintained across the membrane. In the embodiment wherein the membrane is in hollow fiber form, the feed gas mixture may be introduced on the outside or the inside of the hollow fiber. At least one gaseous component in the gas mixture selectively permeates through the membrane more rapidly than the other gaseous component or components in the gas mixture. Gas which is enriched in the selectively permeating gaseous component or components is thus obtained on the low pressure side of the membrane which is removed from the low pressure side of the membrane as permeate. Gas depleted in the selectively permeating gaseous component or components is obtained on the high pressure side of the membrane which is removed from the high pressure side of the membrane as non-permeate.

Gas permeability is defined as $$P = \frac{(\text{amount of permeant})(\text{membrane thickness})}{(\text{area})(\text{time})(\text{driving force across the membrane})}.$$

A standard permeability measurement unit is the Barrer (Ba), which is equal to $$10^{-10} \frac{(\text{centimeter})^3(\text{STP})(\text{centimeter})}{(\text{centimeter})^2(\text{second})(\text{centimeter Hg})},$$

abbreviated hereinafter as $$10^{-10} \frac{\text{cm}^3(\text{STP})\text{cm}}{\text{cm}^2 s\, \text{cmHg}}.$$

The reduced gas flux is defined as (permeability) ÷ (membrane thickness). A standard reduced flux unit is $$10^{-6} \frac{(\text{centimeter})^3(\text{STP})}{(\text{centimeter})^2(\text{second})(\text{centimeter Hg})},$$

abbreviated hereinafter as $$10^{-6} \frac{\text{cm}^3(\text{STP})}{\text{cm}^2 s\, \text{cmHg}}.$$

Alpha, the gas separation factor or gas selectivity, is defined as the ratio of the permeability or flux of the faster permeating gas to the permeability or flux of the slower permeating gas.

The membranes of this invention are particularly useful for separating gas mixtures containing at least one gas selected from the group consisting of hydrogen, helium, oxygen, nitrogen, carbon monoxide, carbon dioxide, water vapor, hydrogen sulfide, ammonia, and light hydrocarbons. As used herein, the term light hydrocarbons refers to gaseous saturated and unsaturated $C_{1-4}$ hydrocarbons such as methane, ethane, ethylene, propane, propylene, butane, and butylene.

The membranes of this invention preferably possess a separation factor at about 30° C. for helium/methane of at least about 45, more preferably of at least about 50. The membranes of this invention preferably possess a permeability for helium of at least about 1.0 Barrers, more preferably of at least about 1.5 Barrers. The membranes of this invention preferably possess a reduced gas flux for helium of at least about $$5.0 \times 10^{-8} \frac{\text{cm}^3(\text{STP})}{\text{cm}^2 s\, \text{cmHg}},$$

more preferably of at least about $$1 \times 10^{-7} \frac{\text{cm}^3(\text{STP})}{\text{cm}^2 s\, \text{cmHg}}.$$

The membranes of this invention preferably possess a separation factor for oxygen/nitrogen at about 30° C. of at least about 4.0, more preferably of at least about 5.0, even more preferably of at least about 5.5. The membranes of this invention preferably possess an oxygen permeability of at least about 0.05 Barrers, more preferably of at least about 0.10 Barrer. The membranes of this invention preferably possess a reduced gas flux for oxygen of at least about $$5.0 \times 10^{-9} \frac{\text{cm}^3(\text{STP})}{\text{cm}^2 s\, \text{cmHg}},$$

more preferably of at least about $$1 \times 10^{-8} \frac{\text{cm}^3(\text{STP})}{\text{cm}^2 s\, \text{cmHg}}.$$

The separation process is carried out at pressures and temperatures which do not deleteriously affect the membrane. Preferably, the pressure on the high pressure side of the membrane is between about 10 psig (68.95 kPa) and about 1000 psig (6895 kPa), more preferably between about 50 psig (344.7 kPa) and about 500 psig (3447.5 kPa). The temperature of the feed gas mixture is preferably between about −50° C. and about 50° C., more preferably between about 0° C. and about 50° C. The temperature of the membrane is preferably between about −50° C. and about 50° C., more preferably between about 0° C. and about 50° C.

The membrane separation process of this invention may be combined with non-membrane separation processes such as cryogenics and pressure swing adsorption. The membranes may be operated in series or parallel.

SPECIFIC EMBODIMENT

The following Example is included to illustrate the invention and is not intended to limit the scope of the invention or claims.

POLYMER PREPARATION

EXAMPLE 1

Preparation of Poly(tetrabromobisphenol A) Xylyl Ether

A polymer of Formula I wherein R is a hydrogen radical, $Ar_1$ is a divalent tetrabromobisphenol A residue, $Ar_2$ is an unsubstituted phenylene reside, w is 0, x is 1, and y and z are 0 was synthesized using the following procedure.

A 3-neck 0.5 liter round bottomed flask equipped with a mechanical stirrer, Dean-Stark apparatus, thermometer, condenser, heating mantle and controller, and gas inlet tube was charged with about 13.597 grams (0.025 moles) of 3,3',5,5'-tetrabromobisphenol A, and about 30 milliliters of freshly distilled N-methyl-2-pyrrolidinone (NMP). The solution was sparged with dry nitrogen for about 15 minutes. Subsequently, the reactor was charged with about 4.15 grams of dry potassium carbonate and about 50 milliliters of NMP. The solution was warmed to about 60° C. and about 4.376 grams (0.025 moles) of recrystallized p-xylylene dichloride was carefully added to the flask. About an additional 20 milliliters of NMP and about 50 milliliters of toluene were added to the flask and the temperature of the reaction mixture was increased to about 120° C. The temperature was maintained at about 120° C. for about 2 hours; the refluxing toluene was removed from the Dean-Stark trap. The resulting viscous, tan-brown liquid was filtered hot through a fritted-glass funnel and precipitated in about 4.0 liters of acidic methanol. The resultant tan, fibrous solid weighed about 15.5 grams when dry. The polymer was found to have an inherent viscosity of about 0.222 dL/g in NMP at about 25° C. at a concentration of about 0.5 grams per deciliter. The glass transition of the polymer was determined to be about 99° C. as measured by Differential Scanning Calorimetry (DSC), using a duPont 1090 thermal analyzer apparatus scanning at a rate of about 20° C. per minute.

The polymer was used to prepare a membrane therefrom. Film was obtained by casting about 20 weight percent polymer solution onto a glass plate, allowing the solution to slowly devolatilize, removing the film from the glass plate, and heating the film in a vacuum oven to remove residual solvent.

The gas permeabilities of nitrogen, oxygen, helium, methane, and carbon dioxide were measured on a dense film having a diameter of about 3.8 centimeters using a constant-volume, variable-pressure apparatus. The permeability coefficients were measured at about 25° C. using a feed pressure of about 30 psia (206.8 kPa). Data for the membrane is reported in Table I.

TABLE I

| Example | Oxygen Permeability (Barrers) | Alpha $O_2/N_2$ | $CO_2$ Permeability (Barrers) | Alpha $CO_2/CH_4$ | Helium Permeability (Barrers) |
| --- | --- | --- | --- | --- | --- |
| 1 | 0.125 | 5.8 | 0.575 | 22.5 | 1.69 |

What is claimed is:

1. A semi-permeable gas separation membrane comprising a thin discriminating region of a xylylene based polyether polymer possessing a backbone structure corresponding to the formula:

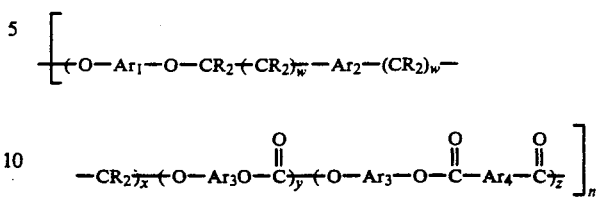

wherein

R is individually in each occurrence a hydrogen radical, a monovalent $C_{1-12}$ hydrocarbyl radical, a $C_{1-12}$ halohydrocarbyl radical, and a halogen, $Ar_1$, $Ar_2$, $Ar_3$, and $Ar_4$ are individually in each occurrence a divalent aromatic residue selected from the group consisting of:

A. an unsubstituted or inertly substituted phenylene, or an unsubstituted or inertly substituted naphthylene;

B. a bisphenylene of the formula:

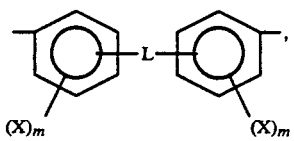

wherein

L is individually in each occurrence selected from the group consisting of a direct bond, a divalent $C_{1-15}$ hydrocarbyl radical, a divalent $C_{1-8}$ halohydrocarbyl radical, —O—, —CO—, —S—, —SO₂—, and —SS—, X is individually in each occurrence selected from the group consisting of a hydrogen radical, a monovalent $C_{1-4}$ hydrocarbyl radical, a $C_{1-4}$ halohydrocarbyl radical, and a halogen, and m is individually in each occurrence a positive integer between 1 and 4 inclusive; and C. a divalent bisphenyl fluorenyl or spiro indanyl radical;

w is a positive integer between 0 and 3 inclusive;

x is a positive integer between 1 and about 500 inclusive, y is a positive integer between 0 and about 500 inclusive, and z is a positive integer between 0 and about 500 inclusive, wherein the ratio of $$\frac{x}{(x+y+z)}$$

is between about 0.002 and 1 inclusive; and n is a positive integer representing a degree of polymerization which provides a number-average molecular weight of at least about 3,000.

2. The membrane of claim 1 wherein at least one of $Ar_1$, $Ar_2$, $Ar_3$, and $Ar_4$ comprise an inertly substituted phenylene or naphthylene, wherein the inert substituents are selected from the group consisting of a monovalent $C_{1-8}$ hydrocarbyl radical, a monovalent $C_{1-8}$ hydrocarbyloxy radical, and a halogen.

3. The membrane of claim 2 wherein the inert substituents are selected from the group consisting of a monovalent $C_{1-6}$ hydrocarbyl radical, a monovalent $C_{1-6}$ hydrocarbyloxy radical, and a halogen.

4. The membrane of claim 3 wherein the inert substituents are a halogen selected from the group consisting of fluorine, chlorine, and bromine.

5. The membrane of claim 1 wherein at least one of $Ar_1$, $Ar_2$, $Ar_3$, and $Ar_4$ comprise a bisphenylene wherein L is selected from the group consisting of a direct bond, a divalent $C_{1-8}$ hydrocarbyl radical, a divalent $C_{1-4}$ halohydrocarbyl radical, —O—, —CO—, —S—, —SO—, —SO$_2$—, and —SS—.

6. The membrane of claim 5 wherein L is selected from the group consisting of a direct bond, a divalent $C_{1-6}$ hydrocarbyl radical, a divalent $C_{1-6}$ halohydrocarbyl radical, —O—, —CO—, —S—, —SO—, —SO$_2$—, and —SS—.

7. The membrane of claim 6 wherein L is selected from the group consisting of a direct bond, a divalent $C_{1-3}$ hydrocarbyl radical, and a divalent $C_{1-3}$ fluorohydrocarbyl radical.

8. The membrane of claim 1 wherein at least one of $Ar_1$, $Ar_2$, $Ar_3$, and $Ar_4$ comprise a bisphenylene wherein X is selected from the group consisting of a hydrogen radical a monovalent $C_{1-6}$ hydrocarbyl radical, and a halogen.

9. The membrane of claim 8 wherein X is a halogen selected from the group consisting of bromine, chlorine, and fluorine.

10. The membrane of claim 1 wherein the membrane is composite or asymmetric.

11. The membrane of claim 1 wherein the membrane is a hollow fiber.

12. The membrane of claim 1 wherein the gas selectivity of oxygen/nitrogen at about 30° is at least about 5.0.

13. The membrane of claim 12 wherein the gas permeability for oxygen at about 30° C. is at least about 0.1 Barrer.

14. The membrane of claim 13 wherein the reduced gas flux for oxygen at about 30° C. is at least about $$1.0 \times 10^{-8} \frac{cm^3(STP)}{cm^2 s\ cmHg}.$$

15. The membrane of claim 1 wherein the gas selectivity of helium/methane at about 30° C. is at least about 50.

16. The membrane of claim 15 wherein the gas permeability for oxygen helium at about 30° C. is at least about 1.0 Barrer.

17. The membrane of claim 16 wherein the reduced gas flux for helium at about 30° C. is at least about $$1.0 \times 10^{-7} \frac{cm^3(STP)}{cm^2 s\ cmHg}.$$

18. A process of separating gases comprising:
A. contacting one side of a semi-permeable gas separation membrane with a feed gas mixture under pressure, wherein the membrane divides a separation chamber into a high pressure side into which the feed gas mixture is fed and a low pressure side;
B. maintaining a pressure differential across the membrane under conditions such that at least one gaseous component in the feed gas mixture selectively permeates through the membrane from the high pressure side to the low pressure side of the membrane;
C. removing from the low pressure side of the membrane permeated gas which is enriched in at least one selectively permeating gaseous component; and
D. removing from the high pressure side of the membrane non-permeated gas which is depleted in at least one selectively permeating gaseous component;

wherein the membrane comprises a thin discriminating region of a xylylene based polyether polymer possessing a backbone structure corresponding to the formula:

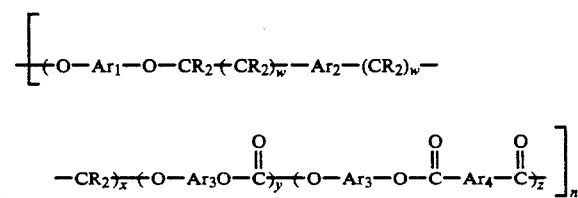

wherein
R is individually in each occurrence a hydrogen radical, a monovalent $C_{1-12}$ hydrocarbyl radical, a $C_{1-12}$ halohydrocarbyl radical, and a halogen,
$Ar_1$, $Ar_2$, $Ar_3$, and $Ar_4$ are individually in each occurrence a divalent aromatic residue selected from the group consisting of:
A. an unsubstituted or inertly substituted phenylene, or an unsubstituted or inertly substituted naphthylene;
B. a bisphenylene of the formula:

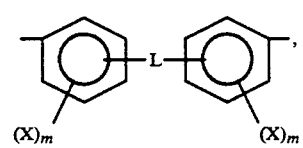

wherein
L is individually in each occurrence selected from the group consisting of a direct bond, a divalent $C_{1-15}$ hydrocarbyl radical, a divalent $C_{1-8}$ halohydrocarbyl radical, —O—, —CO—, —S—, —SO$_2$—, and —SS—,
X is individually in each occurrence selected from the group consisting of a hydrogen radical, a monovalent $C_{1-4}$ hydrocarbyl radical, a $C_{1-4}$ halohydrocarbyl radical, and a halogen, and
m is individually in each occurrence a positive integer between 1 and 4 inclusive; and
C. a divalent bisphenyl fluorenyl or spiro indanyl radical;
w is a positive integer between 0 and 3 inclusive;
x is a positive integer between 1 and about 500 inclusive, y is a positive integer between 0 and about 500 inclusive, and z is a positive integer between 0 and about 500 inclusive, wherein the ratio of $$\frac{x}{(x+y+z)}$$

is between about 0.002 and 1 inclusive; and n is a positive integer representing a degree of polymerization which provides a number-average molecular weight of at least about 3,000.

19. The process of claim 18 wherein the feed gas mixture contains at least one of the gases selected from the group consisting of hydrogen, helium, oxygen, nitrogen, carbon monoxide, carbon dioxide, water vapor, hydrogen sulfide, ammonia, and light hydrocarbons.

20. The process of claim 19 wherein the pressure of the feed gas mixture is between about 5 psig and about 1000 psig.

21. The process of claim 20 wherein the temperature of the feed gas mixture is between about $-50°$ C. and about 50° C.

22. The process of claim 20 wherein the temperature of the membrane is between about $-50°$ C. and about 50° C.

* * * * *